Patented Jan. 28, 1941

2,229,863

UNITED STATES PATENT OFFICE 2,229,863

BRAZING AND WELDING FLUX

Augustus A. Merrill, Steele, N. Dak.

No Drawing. Application November 15, 1939,
Serial No. 304,552

1 Claim. (Cl. 148—26)

This invention refers to that class of compounds commonly known as flux and used in the process of oxy-acetylene or arc welding of metals and consists of a composition formed by the mixing of refined powdered borax, pulverized iron sulphate—copperas, and a pulverized strong potassium carbonate commonly known as Lewis lye.

To prepare this composition, take:

20 ounces of borax,
1 ounce of iron sulphate—copperas, and,
1½ ounces of strong potassium carbonate commonly known as Lewis lye, mix the same together and then grind or pulverize the mixture to a fine powder, stirring the same until the ingredients in powder form are well mixed.

The pulverization of the ingredients is for convenience of application and reliability of action.

The proportions seem to be essential to success but I have succeeded when a degree of variance of proportions in the above proportions have been used in the compound. I therefore do not confine myself to any specific proportions.

I have found by experiment that iron, steel, cast steel or copper may be readily welded, each to its own kind or to any of the other kind without any diminution of the metal or metals by using the above composition as a flux.

This flux may be applied directly in powdered form to the heated parts to be welded or brazed or may be applied to the welding or brazing metal by heating the latter to a red heat and then immersing the same into the powdered flux to which it adheres and because of the heat upon the welding or brazing metal the flux will flow to the parts to be welded.

I claim:

A welding flux compound consisting by weight of approximately 20 parts of borax, 1 part iron sulphate (copperas), and 1½ parts potassium carbonate (Lewis lye).

AUGUSTUS A. MERRILL.